Sept. 12, 1944. J. JORGENSEN 2,358,233
PARACHUTE
Filed July 21, 1943 3 Sheets-Sheet 1
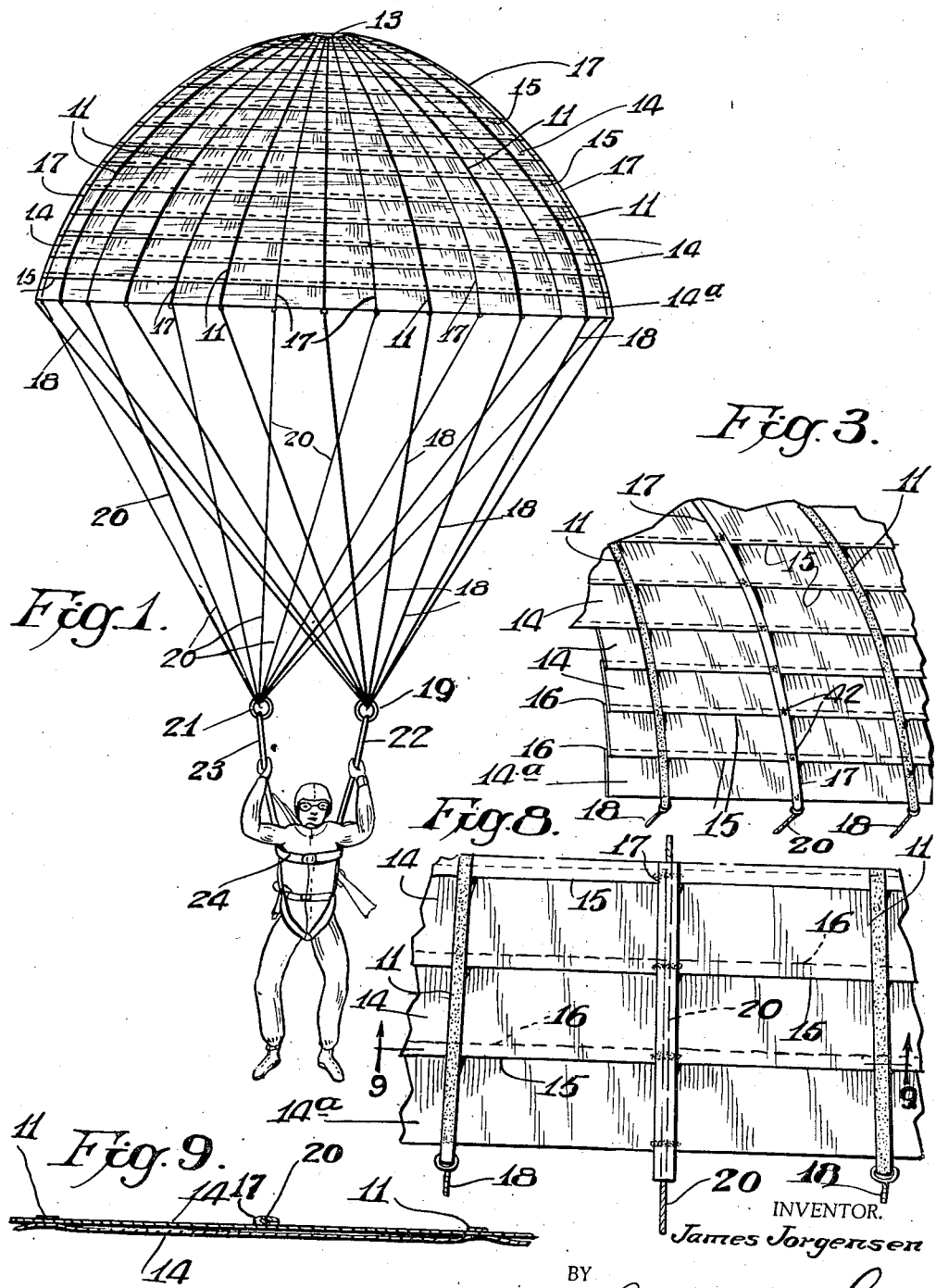
INVENTOR.
James Jorgensen
BY
Leonard L. Kalish
ATTORNEY.

Sept. 12, 1944.   J. JORGENSEN   2,358,233
PARACHUTE
Filed July 21, 1943   3 Sheets-Sheet 2
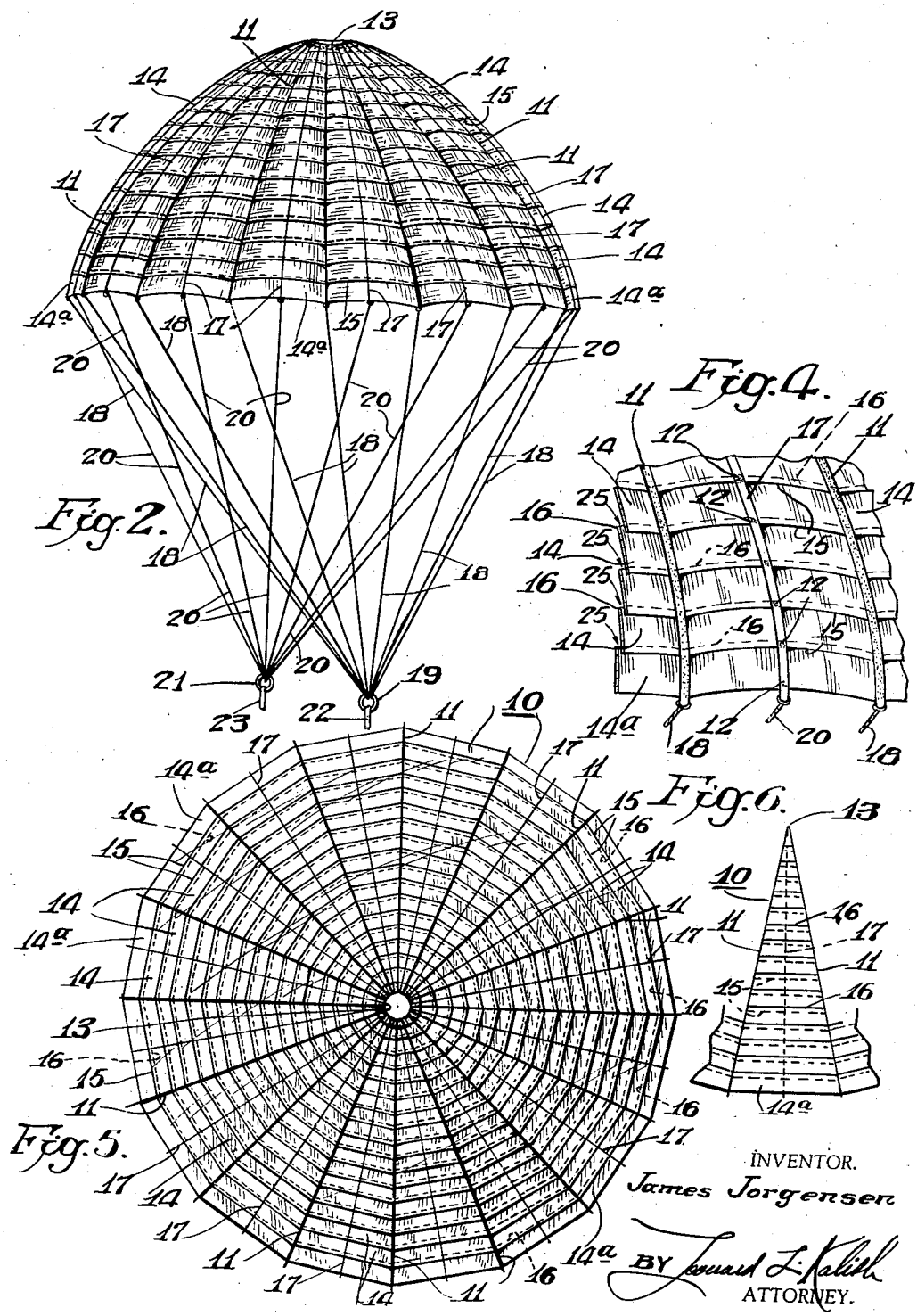
INVENTOR.
James Jorgensen
BY Leonard L. Kalish
ATTORNEY.

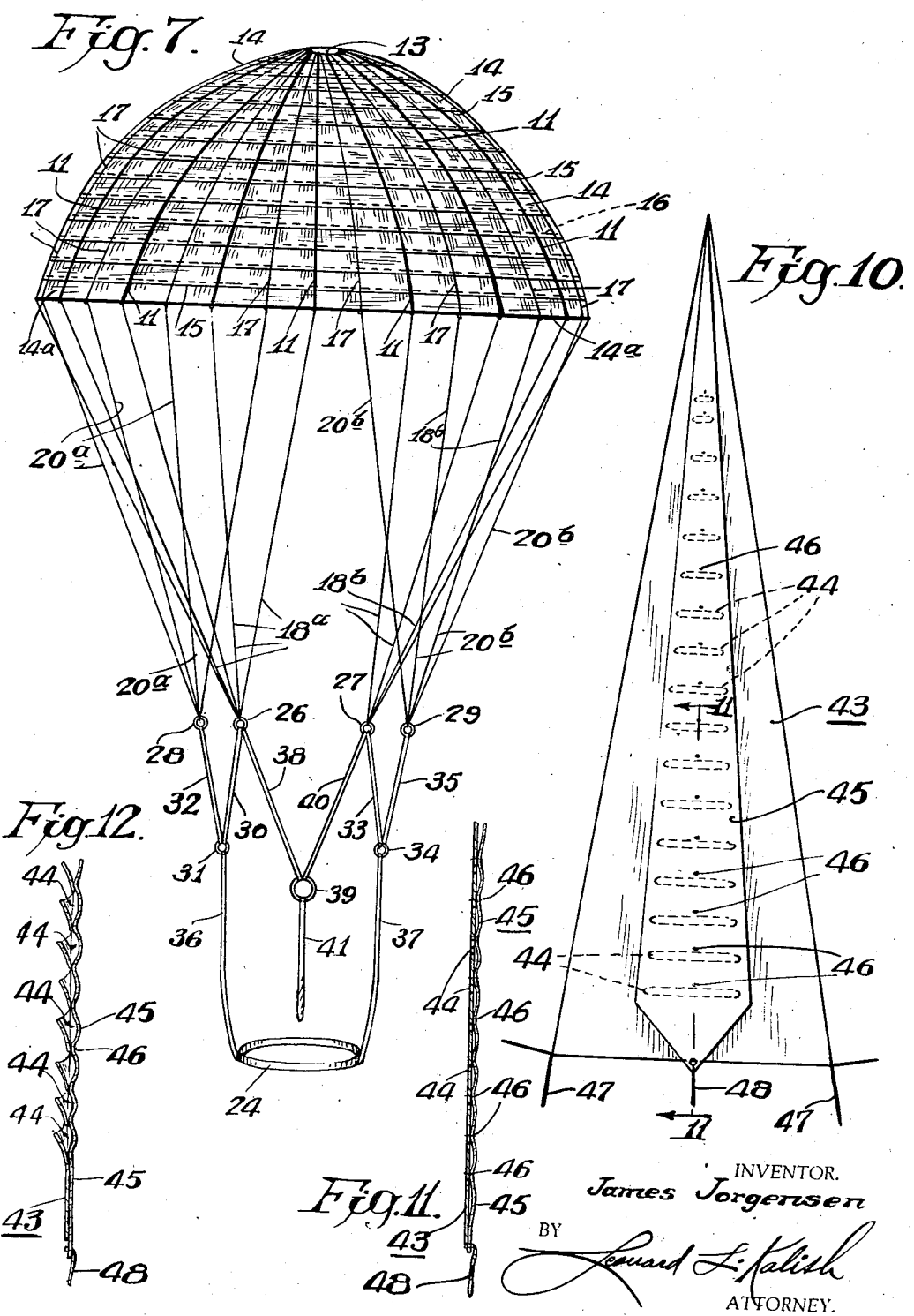

Patented Sept. 12, 1944

2,358,233

UNITED STATES PATENT OFFICE 2,358,233

PARACHUTE

James Jorgensen, West Palm Beach, Fla.

Application July 21, 1943, Serial No. 495,589

2 Claims. (Cl. 244—145)

The present invention relates to parachutes and it relates more particularly to a certain new and useful parachute construction whose speed of descent can be varied.

An object of the present invention is to provide a simple, inexpensive and dependable parachute construction. Another object of the present invention is to provide a parachute construction which will afford the parachutist a maximum degree of safety during the descent. Still another object of the present invention is to provide a parachute construction whose speed of descent can be varied by the parachutist at will. A further object of the present invention is to provide a parachute construction which is less conspicuous and which will afford the parachutist the maximum degree of protection against enemy attack during the descent.

Other objects and advantages of the present invention are apparent in the following detailed description, appended claims, and accompanying drawings.

Conventional parachute constructions have the disadvantage of providing a uniform relatively low speed of descent which exposes the parachutist to attack by enemy aircraft and by enemy ground forces for an undue length of time. The speed of descent of conventional parachute constructions is sufficiently great to give a relatively high impact force upon landing; this impact force being sufficient, in many instances, to injure, and indeed, frequently to disable, the parachutist.

According to my present invention, I provide a parachute construction which can be regulated by the parachutist during the descent to give a relatively greater speed of descent (in order to reduce the time during which the parachutist is exposed to enemy attack) and to give a relatively smaller rate of descent (in order to reduce the impact force upon landing).

Conventional parachutes are constructed of white silk which has a high visibility so as to attract the attention of enemy forces and which, moreover, can readily be set afire by incendiary or tracer bullets. Accordingly, my present invention also contemplates the construction of a parachute from a transparent synthetic material which has a relatively low visibility and which is fire-resistant.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings, in which like reference characters indicate like parts throughout:

Figure 1 represents a more or less schematic side elevational view of one embodiment of the present invention as it appears in use during normal descent.

Figure 2 represents a view generally similar to that of Figure 1 but showing the appearance of the parachute during accelerated descent.

Figure 3 represents a fragmentary elevational view, on an enlarged scale, of the embodiment of Figure 1.

Figure 4 represents a view similar to that of Figure 3 but showing the appearance of the parachute during accelerated descent.

Figure 5 represents a top plan view of the embodiment of Figure 1.

Figure 6 represents a bottom elevational view of one of the segments 10 making up the embodiment of Figure 1.

Figure 7 represents a more or less schematic side elevational view generally similar to that of Figure 1 but showing another embodiment of the present invention.

Figure 8 represents a fragmentary elevational view, on an enlarged scale, of a modified form of the embodiment of Figure 1.

Figure 9 represents a cross-sectional view generally along the line 9—9 of Figure 8.

Figure 10 represents a fragmentary side elevational view of still another embodiment of the present invention.

Figure 11 represents a cross-sectional view generally along the line 11—11 of Figure 10.

Figure 12 represents a cross-sectional view generally similar to that of Figure 11 but showing the appearance of the parachute during accelerated descent.

In one embodiment of the present invention illustrated in Figures 1 to 6, I may provide a parachute which is constructed of a plurality of generally triangular segments 10 shown in Figure 6 which are fastened together along their converging sides 11 as shown in Figure 5 to provide a generally circular body. A central air-escape opening is provided; the apices 13 of the segments 10 terminating short of the center of the body of the parachute.

Each of the segments 10 is made up of a series of overlapping transversely-extending strips 14; the longest strip 14—a constituting the base of the triangular segments 10. Each strip 14 is disposed with its outer edge 15 overlapping the inner edge 16 of its adjoining outer strip. That is, the outer edge 15 of each strip 14 is disposed on the upper side of the parachute as shown in Figure 5, overlapping the inner edge 16 of the adjoining strip; each of the inner edges 16 being disposed on the bottom side of the parachute as shown in Figure 6.

The strips 14 are fastened continuously along their transverse ends at the sides 11 of the segments 10.

The connected sides 11 of adjacent segments 10 may be reinforced to provide the necessary support for the parachutist as will be described hereinbelow.

A line or band 17 of reinforcing material is provided upon the top side of each segment 10; the line 17 extending from the apex 13 of the triangular segment to the base and bisecting the angle formed at said apex 13. As can be seen particularly in Figure 6, each segment 10 is an equilateral triangle, of which the reinforcing line 17 constitutes the perpendicular line or altitude.

The reinforcing line 17 is fastened as at 42 to the adjacent portions of the outer edges 15 of the strips 14; the inner edges 16 of said strips 14 being left unfastened except at the sides 11 of the segments 10. That is, the overlapping outer edges 15 of the strips 14 are connected to the reinforcing line 17 while the inner edges 16 are not connected to the reinforcing line 17 but are free to move downwardly away from the underside of the next overlapping segment.

As shown particularly in Figure 1, supporting lines 18 extend downwardly from each of the sides 11 to a ring 19. Supporting lines 20 extend downwardly from each of the reinforcing lines 17 to a ring 21.

A strap 22 extends downwardly from the ring 19 and connects with the harness 24 of the parachutist while a similar strap 23 extends downwardly from the ring 21 to the harness 24.

During normal relatively slow descent, the weight of the parachutist is supported equally by the lines 18 and 20. When the weight is thus supported equally from the lines 18 and 20, the reinforcing lines 17 are held taut against the top side of the segments 10 and the upward pressure of air on the bottom or concave face of the parachute holds the free inner edges 16 of the strips 14 in closed position so that air can escape from the parachute only through the central opening 12 thereof. In this way, the parachute exerts a relatively great sustaining force so that the speed of descent is relatively low.

When it is desired to descend more rapidly, the parachutist pulls upon the strap 22 so that his weight is supported only from the lines 18 and the sides 11; the lines 20 and the reinforcing lines 17 being slack. Slackening of the reinforcing lines 17 permits the segments 10 to bulge outwardly from their sides 11 and results in opening of the inner edges 16 of the strips 14 as shown in the Figures 2 and 4. This opening of the inner edges 16 of the strips 14 produces a series of auxiliary air-escape openings 25 which reduces the sustaining force exerted by the parachute and thus increases the rate of descent.

When a parachutist jumps from a relatively high altitude he may, as soon as his initial fall has been checked, pull the strap 22 to open the auxiliary openings 25 so that he falls with relatively greater than normal speed until he comes within a short distance from the ground. At that point, the parachutist may release the strap 22 so that his weight is again shifted to the lines 20 and the reinforcing lines 17 to close the auxiliary openings 25 and thus to increase the sustaining force of the parachute and to permit a relatively slow and "soft" landing.

Where it is desired suddenly to check the rate of fall, the parachutist may, indeed, grasp the strap 23 so as to transfer the greater part of this weight to the lines 20 and the reinforcing lines 17 thereby more suddenly to close the auxiliary openings 25.

It is apparent that the parachutist can regulate his rate of fall by regulating the ratio of weight carried by the lines 18 and 20 respectively. That is, if he desires to accelerate his fall only slightly, he may exert only a slight pull upon the strap 22 so that the supporting lines 20 and the reinforcing lines 18 slacken only slightly to permit the auxiliary openings 25 to open only to a small extent. A stronger pull upon the strap 22 will result in increasing the size of the auxiliary openings 25. It is obvious that by regulating the degree of pull upon the strap 22, the parachutist can regulate his speed of descent as desired.

In Figure 7 there is shown a modified form of the present invention in which means for varying the speed of descent is incorporated with means for varying the direction of descent.

The embodiment of Figure 7 generally resembles that of Figure 1 in the construction of the segments 10.

However, the supporting lines 18—a from the sides 11 situated in half the circumference of the parachute are attached to a ring 26 while the supporting lines 18—b from the sides 11 situated in the other half of the circumference of the parachute are attached to a ring 27.

Similarly, the supporting lines 20—a from the reinforcing lines 17 situated in half the circumference of the parachute are connected to a ring 28 while the supporting line 20—b from the reinforcing line 17 situated in the other half of the circumference of the parachute are connected to a ring 29.

A strap 30 connects the ring 26 to a lower ring 31 while a similar strap 32 connects the ring 28 to the ring 31.

A strap 33 connects the ring 27 to a lower ring 34, while a similar strap 35 connects the ring 29 to the ring 34.

A strap 36 connects the ring 31 to the harness 24 while a similar strap 37 connects the ring 34 to the harness 24.

A strap 38 connects the ring 26 to a central ring 39 and a similar strap 40 connects the ring 34 to the central ring 39.

A central strap 41 extends downwardly from the ring 39.

The strap 41 is ordinarily slack being either unconnected at its lower end or being slackly connected to the harness (not shown).

It can be seen that in ordinary descent, with the strap 41 slack, the weight of the parachutist will be distributed equally from all of the supporting lines 18—a, 18—b, 20—a and 20—b.

When the parachutist desires to move laterally during the descent, he may pull upon either the strap 36 or the strap 37, to tilt the parachute and thus to cause a side-slip in the desired direction.

When the parachutist desires to increase his rate of descent, he may pull upon the strap 41 which will transfer his weight to the supporting line 18—a and 18—b and the sides 11 thereby to cause the lines 20—a and 20—b and the reinforcing lines 17 to slacken, thereby to open the auxiliary openings 25 as described hereinabove.

When the parachutist desires to check his rate of descent, he merely releases the strap 41 where-upon the auxiliary openings 25 are closed and the sustaining force of the parachute increased accordingly.

I prefer to construct the novel parachute of the present invention of a relatively thin flexible transparent fire-resistant synthetic material, such as one of the several commercial synthetic materials, for example, one of the several synthetic plastics, now available.

The use of such transparent material reduces the visibility of the parachute in the air and thus lessens the possibility of the parachutist being detected and attacked by enemy forces.

Should the parachutist be attacked, the fire-resistant qualities of the material lessen the danger of the parachute catching fire from incendiary or tracer bullets.

Furthermore, the use of a thermo-plastic synthetic material permits the fastening of the ends of the strips 14 to the sides 11 and the fastening together of adjacent sides 11 and the fastenings 42 to be effected simply by the use of heat. This eliminates the costly and time-consuming sewing operations required in conventional parachute construction and, furthermore, gives connections which are much stronger and are less apt to give way under the severe stress resulting from the initial opening of the parachute during a jump.

Additionally, such synthetic material is less expensive and more readily available than ordinary silk and can be discarded, if desired, after a single jump.

Furthermore, a parachute constructed of transparent synthetic material according to my present invention can be "packed" in a considerably smaller space than conventional silk parachuates, so it is possible either to equip the parachutist with two parachutes without appreciably increasing the size of the bundle now carried or to greatly reduce the size of the bundle now required for a single parachute.

In Figures 8 and 9, I have shown a modified form of the present invention in which the supporting lines 20, instead of terminating at the ends of the transparent reinforcing lines 17 as in the embodiment of Figure 1, continue all the way into the center of the parachute; the reinforcing lines 17 being formed as a two-ply strip with the line 20 disposed intermediate the plies. In this way, the line 20 provides additional strength and support for the reinforcing lines 17.

In Figures 10, 11 and 12, I have shown still another embodiment of the present invention in which (instead of the segments 10 being made up of separate transverse-extending strips 14 connected at their ends as in embodiment of Figure 1) I employ triangular segments 43 which are integrally formed and which are provided with transversely-extending air-escape slots 44. A band 45 extends along the top of each of the segments 43 generally equidistant from the converging sides thereof. The band 45 is connected as at 46 to one of the edges of each of the slots 44; the other edge being left unconnected. The band 46 is generally triangular and is adapted to cover the slots 44 when pulled taut. Supporting cords 47 extend downwardly from the sides of the segments 43, while supporting cords 48 extend downwardly from the bands 45; the cords 47 and the cords 48 being adapted to be connected to the harness of the parachute either in the manner shown in Figure 1 or in the one shown in Figure 7. When the weight of the parachutist is supported equally from the cords 47 and 48, the bands 45 are held taut and the air-escaped slots 44 are closed. When, on the other hand, the parachutist's weight is transferred from the cords 48, the band 45 becomes slack and the air-escape slots open as shown particularly in Figure 12 to increase the rate of descent of the parachute.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what I claim as new and desire to protect by Letters Patent is:

1. A parachute comprising a plurality of generally triangular segments continuously fastened to each other along their converging sides, each of said segments being made up of a plurality of overlapping laterally-extending strips fastened at said converging sides but otherwise unconnected, a supporting band extending along the top of each of said segments generally equidistant from said converging sides, the overlapping edges of said strips being attached to said band, supporting cords extending down from each of said converging sides and connecting with the harness of said parachute, supporting cords extending down from each of said supporting bands and connecting with the harness, the weight of the parachutist being normally more or less equally supported from all of said cords, means connected to the cords extending from the converging sides and other means connected to the cords extending from the supporting bands whereby at least a preponderance of the parachutist's weight can be transferred to the cords extending from said converging sides, thereby to slacken said supporting bands and to permit said overlapping strips to open and to provide auxiliary air-escape openings.

2. A parachute comprising a plurality of generally triangular segments continuously fastened to each other along their converging sides, each of said segments having a plurality of transversely-extending auxiliary air-escape slots formed therein, a supporting band extending along each of said segments and being adapted to close said air-escape slots when taut and to permit opening of said air-escape slots when slack, supporting means separately leading from each of said converging sides and from each of said bands and connected to the harness of said parachute, whereby the weight of the parachute normally keeps the bands taut and the air-escape slots closed, means connected to the cords extending from the converging sides and other means connected to the cords extending from the supporting bands whereby at least a preponderance of the parachutist's weight can be transferred from said supporting bands, thereby to slacken said bands and to permit opening of said air-escape slots.

JAMES JORGENSEN.